(12) United States Patent
Zheng et al.

(10) Patent No.: US 9,736,993 B2
(45) Date of Patent: Aug. 22, 2017

(54) STIMULATING DEVICE FOR ENHANCING RELEASE OF NEGATIVE AIR IONS BY A PLANT, AND PLANT-BASED NEGATIVE AIR ION PRODUCING DEVICE

(71) Applicant: FUJIAN AGRICULTURE AND FORESTRY UNIVERSITY, Fujian Province (CN)

(72) Inventors: Jin-Gui Zheng, Fujian Province (CN); Ren-Ye Wu, Fujian Province (CN); Da-Peng Ye, Fujian Province (CN); Zhi-Jian Yang, Fujian Province (CN); Chuan-Yuan Deng, Fujian Province (CN); Hai-Yong Weng, Fujian Province (CN); Jia-Ming Yu, Fujian Province (CN); Chin-Chao Pai, Fujian Province (CN); Jun-Rong Zhutie, Fujian Province (CN); Hui Lin, Fujian Province (CN); Xiao-Bin Shi, Fujian Province (CN)

(73) Assignee: Fujian Agriculture and Forestry University, Fujian Province (CN)

( * ) Notice: Subject to any disclaimer, the term of this patent is extended or adjusted under 35 U.S.C. 154(b) by 169 days.

(21) Appl. No.: 14/677,441

(22) Filed: Apr. 2, 2015

(65) Prior Publication Data
US 2015/0282436 A1    Oct. 8, 2015

(30) Foreign Application Priority Data

Apr. 7, 2014  (TW) .............................. 103112681 A

(51) Int. Cl.
*A01G 1/00*      (2006.01)
*A01G 7/04*      (2006.01)
*F24F 3/16*      (2006.01)

(52) U.S. Cl.
CPC ........ *A01G 7/04* (2013.01); *F24F 2003/1653* (2013.01); *F24F 2003/1682* (2013.01)

(58) Field of Classification Search
CPC ................ A01G 7/04; F24F 2003/1653; F24F 2003/1682
(Continued)

(56) References Cited

U.S. PATENT DOCUMENTS 882,699 A * 3/1908 Latshaw ................ A01G 9/021
                                                    47/1.3
2,831,804 A * 4/1958 Collopy .................. A01G 7/04
                                                    204/515
(Continued)

FOREIGN PATENT DOCUMENTS

CN    102068713 A  *  5/2011  ............... A01G 7/04
CN    201957493 U  *  9/2011
(Continued)

OTHER PUBLICATIONS

Translation provided of CN102068713A.*
(Continued)

*Primary Examiner* — Marc Burgess
*Assistant Examiner* — Morgant T Barlow
(74) *Attorney, Agent, or Firm* — LeClairRyan

(57) ABSTRACT

A stimulating device for enhancing release of negative air ions by a plant includes a plant pot to receive a culture medium for cultivating the plant, and a negative voltage pulse module that outputs a negative voltage pulse to stimulate the plant via a pair of first and second conductive terminals. The first conductive terminal contacts the culture medium. The second conductive terminal is non-contact with the culture medium when the culture medium is placed in the plant pot.

12 Claims, 8 Drawing Sheets

(58) Field of Classification Search
USPC .......................................................... 47/1.3
See application file for complete search history.

(56) References Cited

U.S. PATENT DOCUMENTS

| | | | |
|---|---|---|---|
| 4,226,246 A | 10/1980 | Fragnet | |
| 4,678,554 A * | 7/1987 | Oppitz | A01G 7/04 204/290.11 |
| 4,960,524 A * | 10/1990 | Inculet | B03C 5/005 204/513 |
| 5,464,456 A * | 11/1995 | Kertz | A01G 7/04 47/1.3 |
| 5,740,627 A * | 4/1998 | Levengood | A01C 1/00 47/1.3 |
| 6,010,613 A * | 1/2000 | Walters | C12M 35/02 205/701 |
| 6,516,563 B1 * | 2/2003 | Matthews | A01G 9/02 47/66.1 |
| 8,234,814 B2 * | 8/2012 | Kertz | A01G 9/024 47/17 |
| 8,690,997 B2 * | 4/2014 | Tatsumi | A01G 7/04 40/463 |
| 2005/0186108 A1 * | 8/2005 | Fields | A61L 2/10 422/4 |
| 2007/0266624 A1 * | 11/2007 | Tanaka | A01G 7/04 47/1.3 |
| 2011/0273143 A1 * | 11/2011 | Aanensen | H02J 7/0075 320/139 |

FOREIGN PATENT DOCUMENTS

| | | |
|---|---|---|
| CN | 203721419 U * | 7/2014 |
| JP | H02255020 A | 10/1990 |
| JP | 2004208626 A | 7/2004 |
| JP | 3142022 U | 6/2008 |
| JP | 2010515426 A | 5/2010 |
| KR | 101999-0064904 A | 8/1999 |

OTHER PUBLICATIONS

Yang Yun-Jing, Xi Gang, Liu Kai, Zhang Xiao-Hui, Application of Negative High-voltage Pulse Technology to Improve Air Purification Ability of Plants, High Voltage Engineering, vol. 37, No. 1, Jan. 31, 2011, pp. 190-197, China Academic Journal Electronic Publishing House, China.

* cited by examiner

STIMULATING DEVICE FOR ENHANCING RELEASE OF NEGATIVE AIR IONS BY A PLANT, AND PLANT-BASED NEGATIVE AIR ION PRODUCING DEVICE

CROSS-REFERENCE TO RELATED APPLICATION

This application claims priority of Taiwanese Application No. 103112681, filed on Apr. 7, 2014.

FIELD

The disclosure relates to a negative air ion producing device, and more particularly to a plant-based negative air ion producing device.

BACKGROUND

The concentration of negative air ions (NAI) is an important index for evaluating air quality. Therefore, purely electrical NAI generators have been developed for indoor air purification. The NAI generated by such devices are different from plant-sourced NAI, which may be more beneficial to health. However, under an ordinary environment, the ability of a plant to release NAI is too weak to achieve a satisfactory NAI concentration.

SUMMARY

Therefore, an object of the disclosure is to provide a stimulating device for enhancing release of negative air ions by a plant.

According to one aspect of the disclosure, the stimulating device includes a housing, a plant pot, first and second conductive terminals and a negative voltage pulse module. The housing includes a first surrounding wall that defines an inner chamber. The plant pot is disposed in the inner chamber, and is configured to receive a culture medium for cultivating the plant. The first conductive terminal passes through the plant pot for contact with the culture medium. The second conductive terminal is spaced apart from the first conductive terminal, is disposed on one of the housing and the plant pot, and is to be non-contact with the culture medium when the culture medium is placed in the plant pot. The negative voltage pulse module is disposed on the housing, includes a first electrode electrically coupled to the first conductive terminal, and a second electrode electrically coupled to the second conductive terminal, and is configured to output a negative voltage pulse at the first electrode so as to stimulating the plant via the culture medium for enhancing release of the negative air ions thereby.

Another object of the disclosure is to provide a plant-based negative air ion producing device.

According to another aspect of the disclosure, the plant-based negative air ion producing device includes a housing, a plant pot, a culture medium, a plant, first and second conductive terminals and a negative voltage pulse module. The housing includes a first surrounding wall that defines an inner chamber. The plant pot is disposed in the inner chamber. The culture medium is disposed in the plant pot. The plant is cultivated in the culture medium and releases negative air ions. The first conductive terminal passes through the plant pot for contact with the culture medium. The second conductive terminal is spaced apart from the first conductive terminal, is disposed on one of the housing and the plant pot, and is to be non-contact with the culture medium. The negative voltage pulse module is disposed on the housing, includes a first electrode electrically coupled to the first conductive terminal, and a second electrode electrically coupled to the second conductive terminal, and is configured to output a negative voltage pulse at the first electrode so as to stimulating the plant via the culture medium for enhancing release of the negative air ions thereby.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
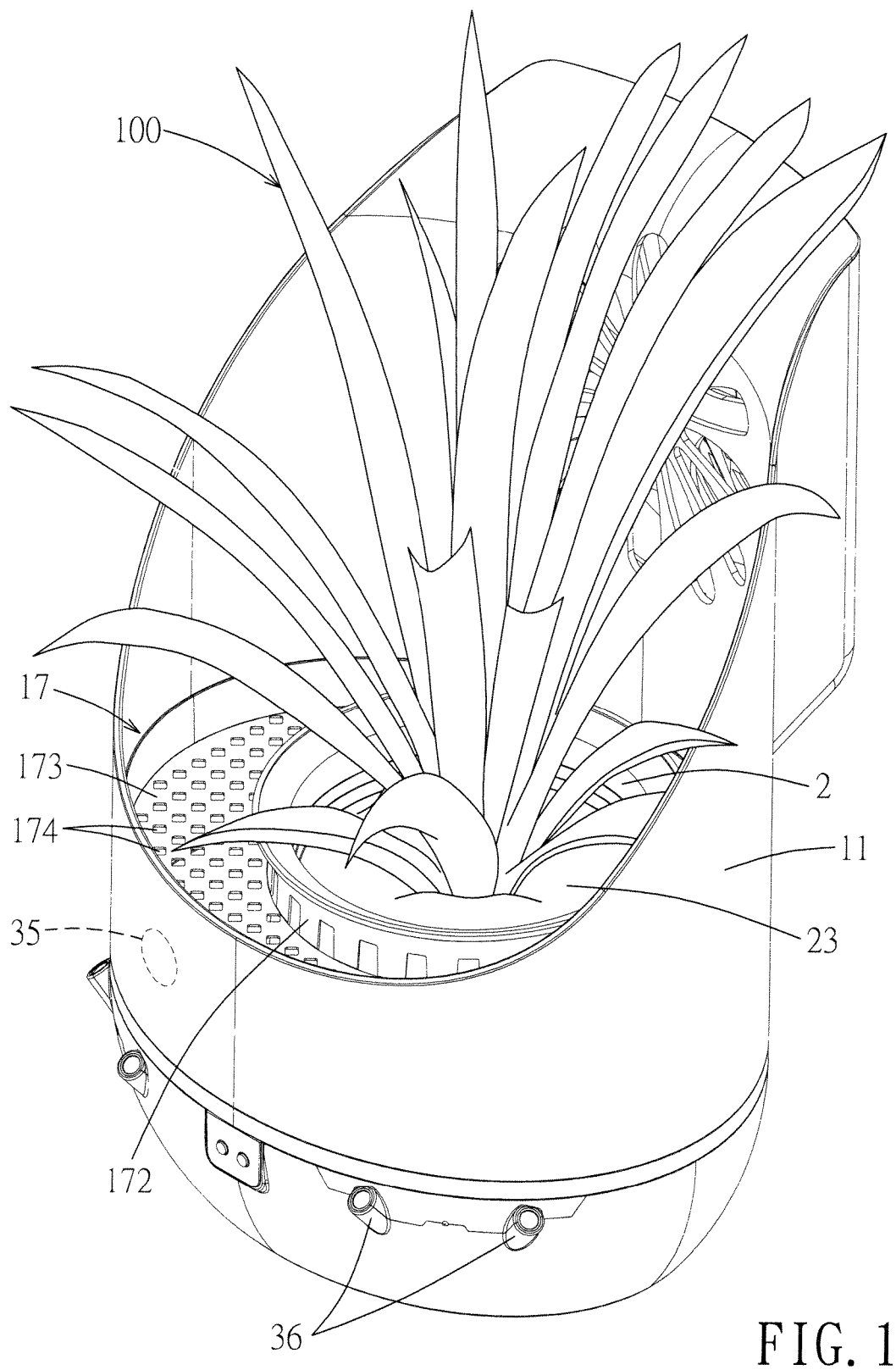
FIG. 1 is a perspective view illustrating a first embodiment of the plant-based negative air ion producing device according to the disclosure.

Before the disclosure is described in greater detail, it should be noted that like elements are denoted by the same reference numerals throughout the disclosure.

Referring to FIGS. 1 to 4, the first embodiment of the plant-based negative air ion (NAI) producing device according to this disclosure is shown to include a stimulating device that includes a housing 1, a plant pot 2 filled with a culture medium (e.g., soil, culture liquid, etc.) in which a plant 100 may be cultivated, a first conductive terminal 22, a second conductive terminal 14 and a negative voltage pulse module 3. The housing 1 has a first annular surrounding wall 12 that defines an inner chamber 121, a second annular surrounding wall 11 that surrounds the first annular surrounding wall 12, and an interconnecting wall 13 that interconnects bottom parts of the first and second annular surrounding walls 12, 11. In this embodiment, the first conductive terminal 22 passes through a bottom of the plant pot 2 for contact with the culture medium. The second conductive terminal 14 is disposed on the interconnecting wall 13 of the housing 1, and is exposed in the air and non-contact with the culture medium when the culture medium is placed in the plant pot 2. In addition, the housing 1 may further include a seat 15 separably disposed under the interconnecting wall 13 for accommodating the negative voltage pulse module 3 therein. In one embodiment, the second conductive terminal 14 may be disposed on the plant pot 2 and is non-contact with the culture medium when the culture medium is placed in the plant pot 2.

Referring to FIG. 1, in this embodiment, the plant 100 cultivated in the plant pot 2 belongs to Agavoideae, and is for example, Agave Americana. The plant of the Agavoideae subfamily is superior in the ability to release NAI, drought resistance, shade resistance, etc., has a long life span (which may lead to longer time NAI release period), and grows well indoors. High negative voltage pulses applied to the first conductive terminal 22 (see FIGS. 2 and 4) may stimulate a root portion of the plant 100 via the culture medium, thereby enhancing release of NAI by the plant 100. In one embodiment, the high negative voltage pulses may range between −4 KV and −20 KV and are applied with a frequency ranging between 0.5 Hz and 2 Hz.

Figure 2:
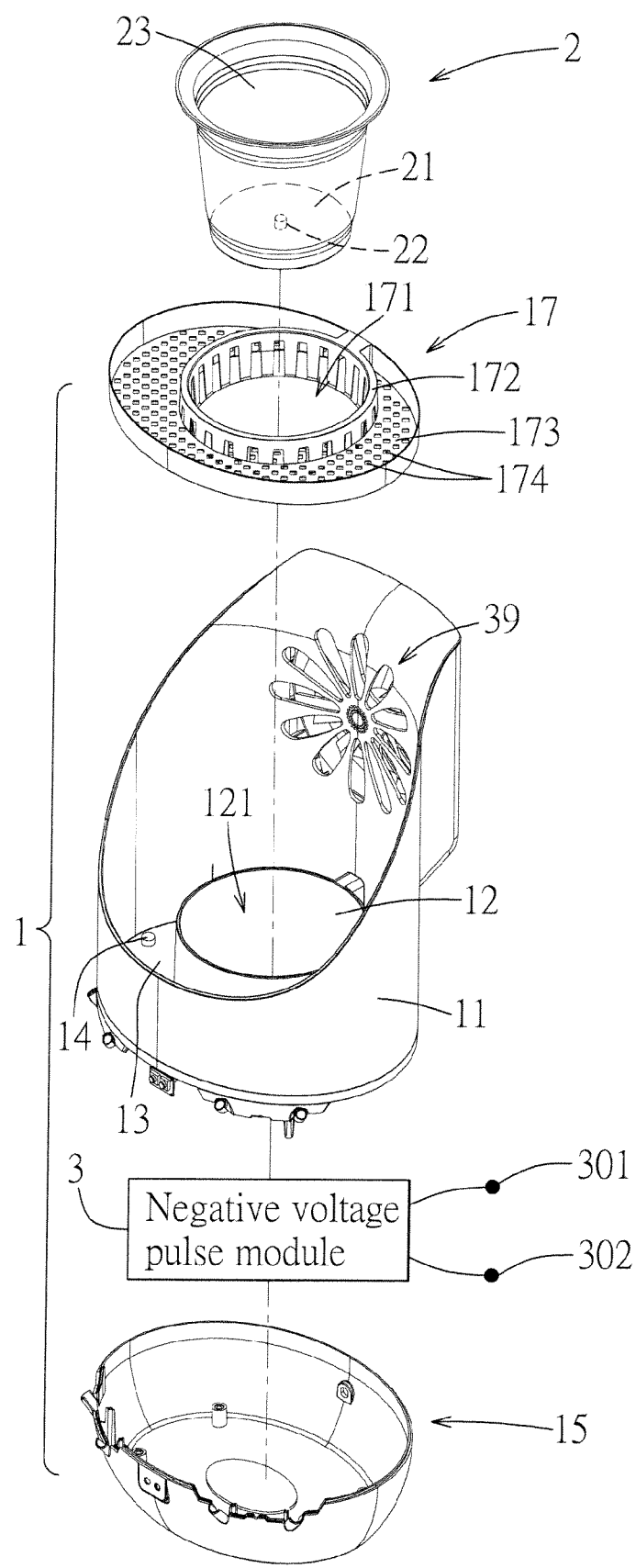
FIG. 2 is an exploded perspective view illustrating a stimulating device of the first embodiment.

Referring to FIG. 2, in this embodiment, the housing 1 further includes an annular bearing plate 17 that is separably mounted to the first annular surrounding wall 12, that has an annular plate portion 173 disposed between the first and second annular surrounding walls 12, 11 and above the interconnecting wall 13, and a central opening 171 corresponding in position to and in spatial communication with the inner chamber 121. The plate portion 173 of the bearing plate 17 cooperates with the first annular surrounding wall 12, the second annular surrounding wall 11 and the interconnecting wall 13 to form an outer chamber 16 thereamong, as shown in FIG. 4.

Figure 4:
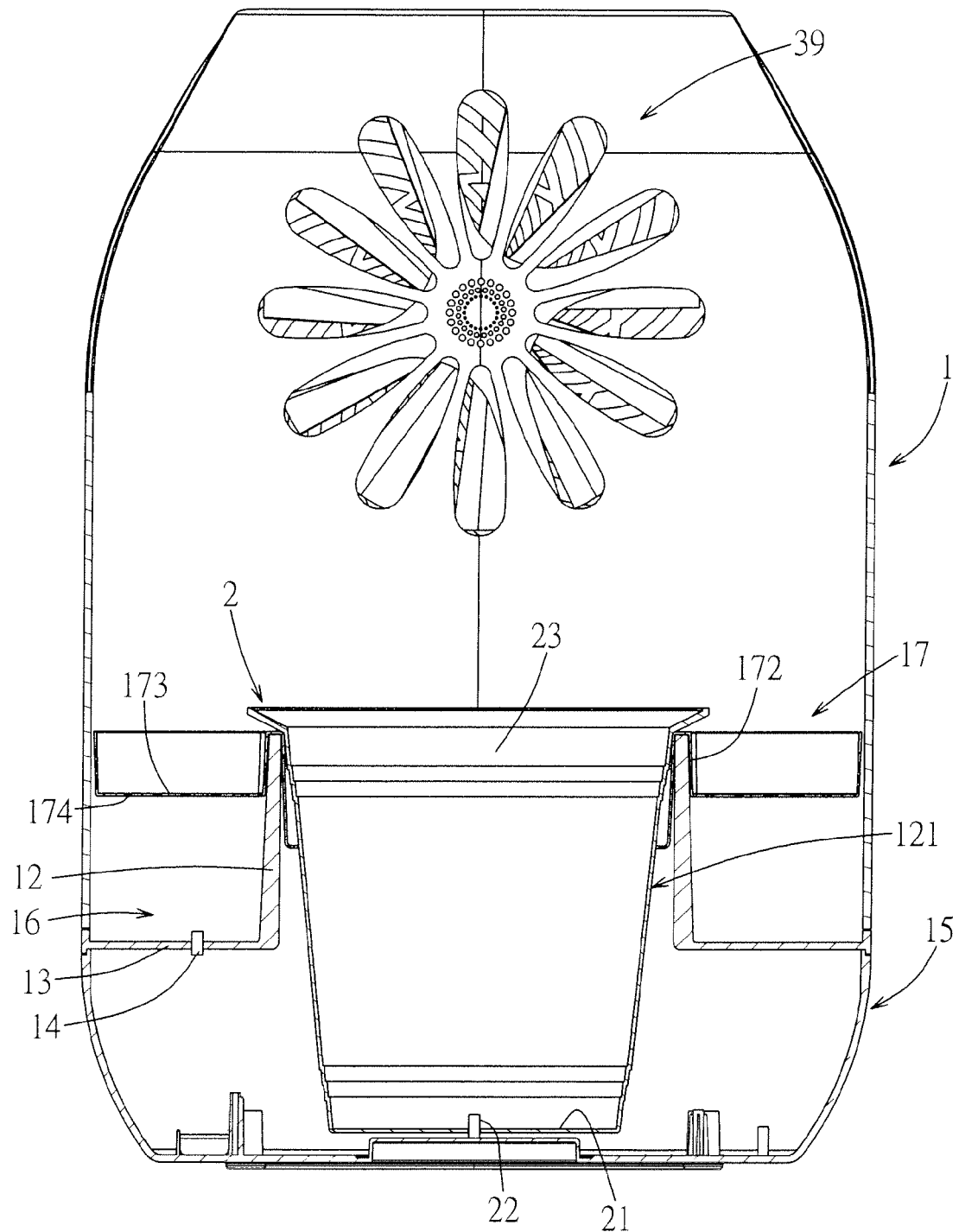
FIG. 4 is a sectional view of the stimulating device taken along line II-II in FIG. 3.

Further referring to FIG. 4, in this embodiment, the bearing plate 17 has an annular engaging portion 172 that has an inverse-V-shaped cross section, and that is hookably engaged with the first annular surrounding wall 12. In one embodiment, an outer peripheral part of the bearing plate 17 protrudes away from the interconnecting wall 13 and abuts against an inner surface of the second annular surrounding wall 11, such that the bearing plate 17 may be firmly mounted above the interconnecting wall 13. When the plant pot 2 is placed in the inner chamber 121, a peripheral edge portion of the plant pot 2 that surrounds a top opening 23 of the plant pot 2 abuts against a top part of the engaging portion 172. The first annular surrounding wall 12 together with the annular engaging portion 172 may provide sufficient structural strength for holding the plant pot 2 hanging in the inner chamber 121.

Figure 3:
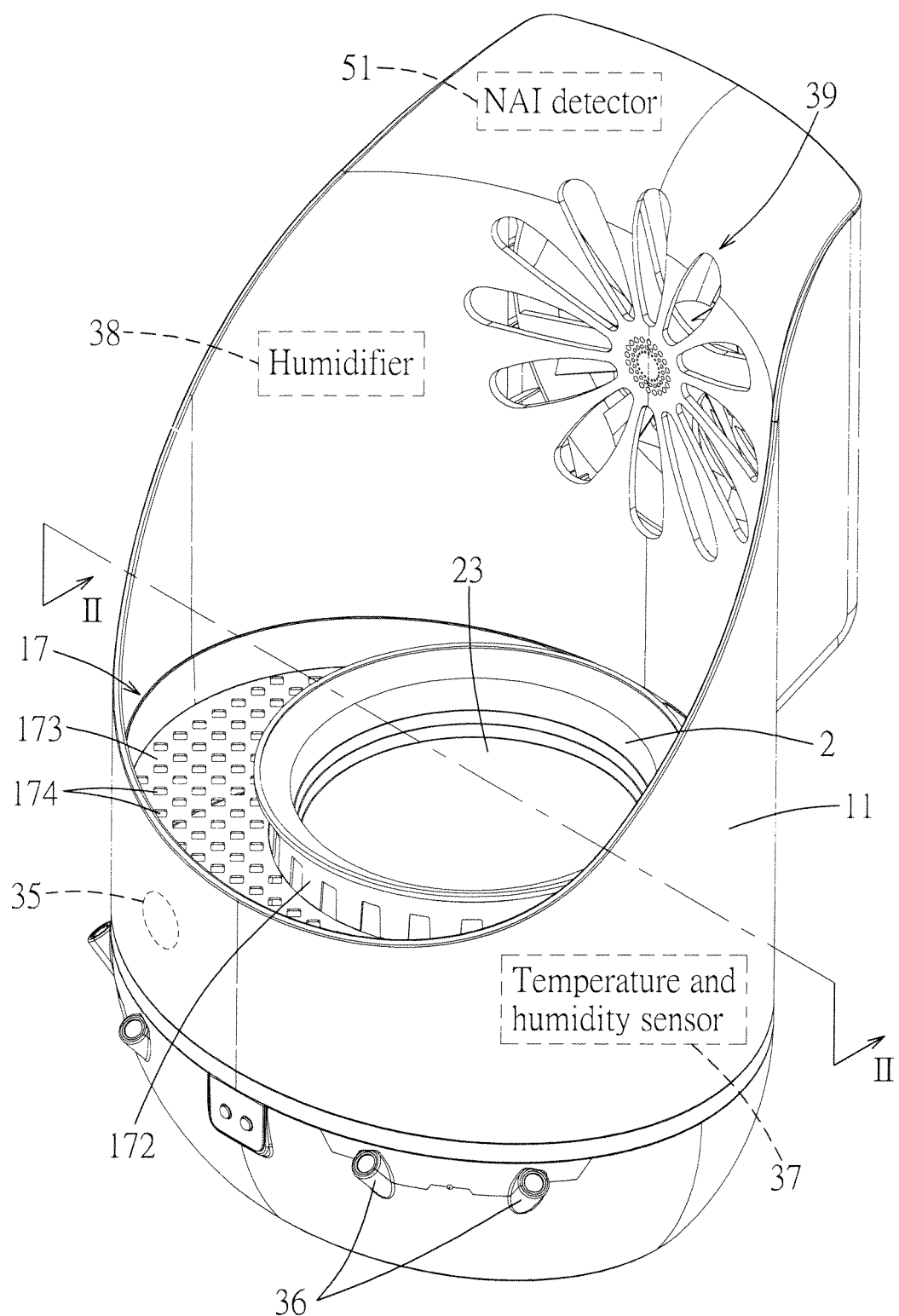
FIG. 3 is a perspective view illustrating the stimulating device.

Referring to FIGS. 1-3, a bottom surface of the bearing plate 17 is formed with a plurality of through holes 174 for helping securing the other plants that may be cultivated in the outer chamber 16.

Figure 5:
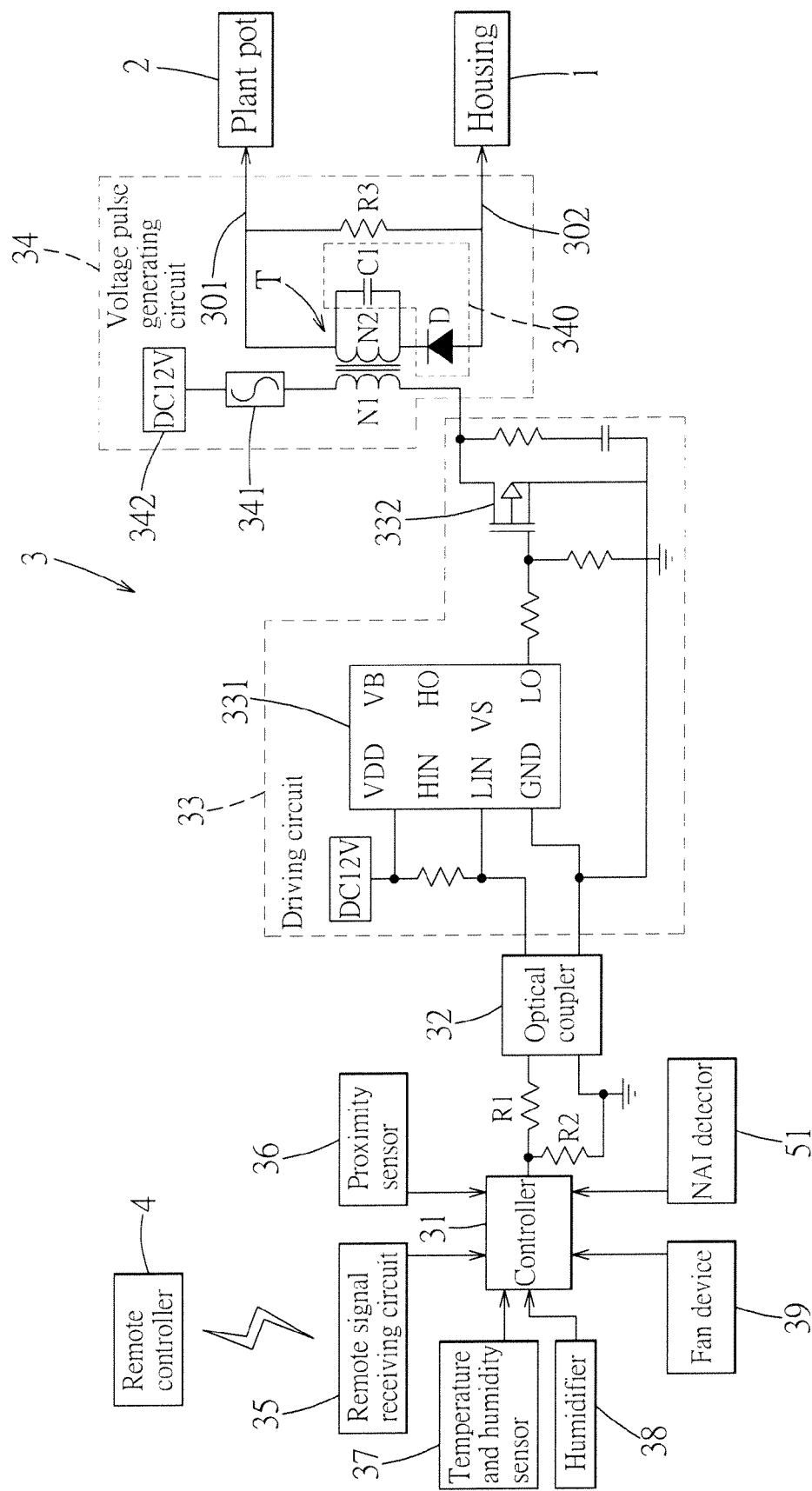
FIG. 5 is a block diagram illustrating a negative voltage pulse module of the stimulating device.
Figure 6:
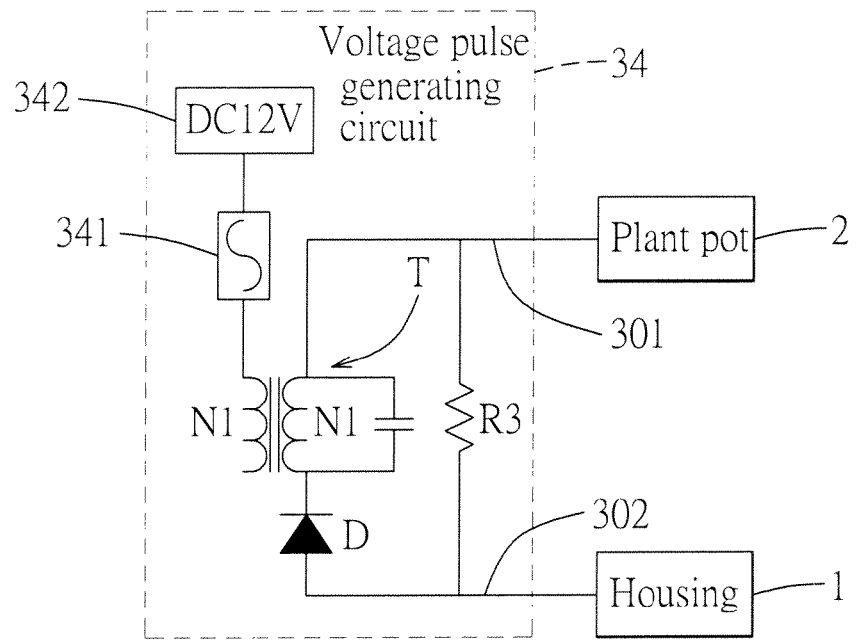
FIG. 6 is a block diagram illustrating first and second electrodes of the stimulating device that have no direct electrical connection therebetween.
Figure 7:
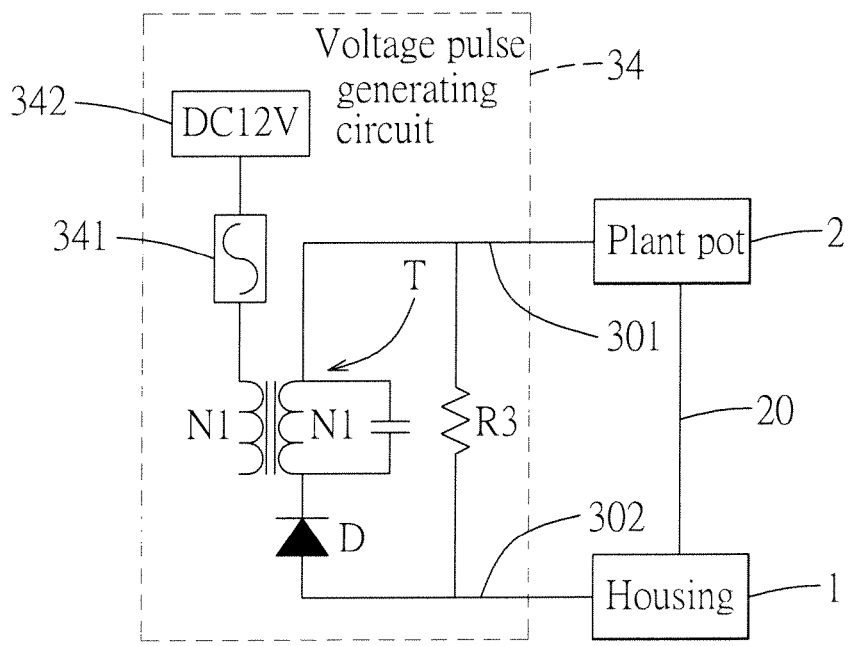
FIG. 7 is a block diagram illustrating the first and second electrodes of the stimulating device that have direct electrical connection therebetween.
Figure 8:
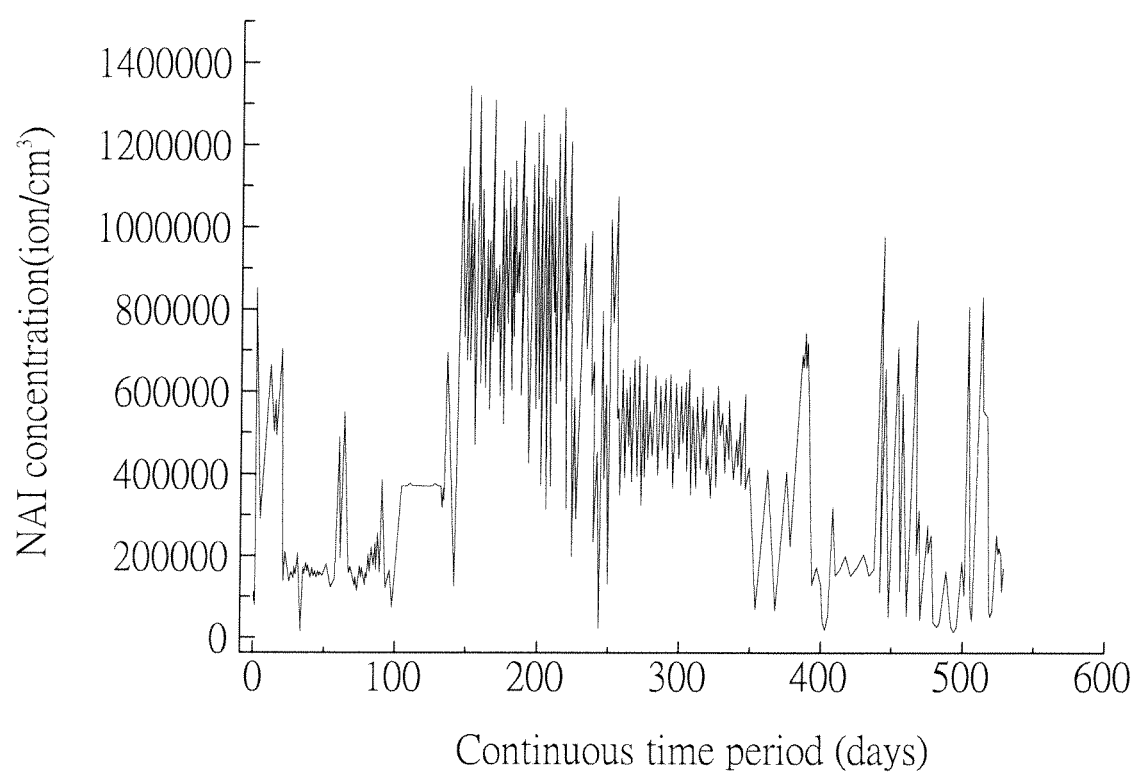
FIG. 8 is a graph showing a record of the negative air ion concentration resulting from a pot of Agave americana with use of the stimulating device.
Figure 9:
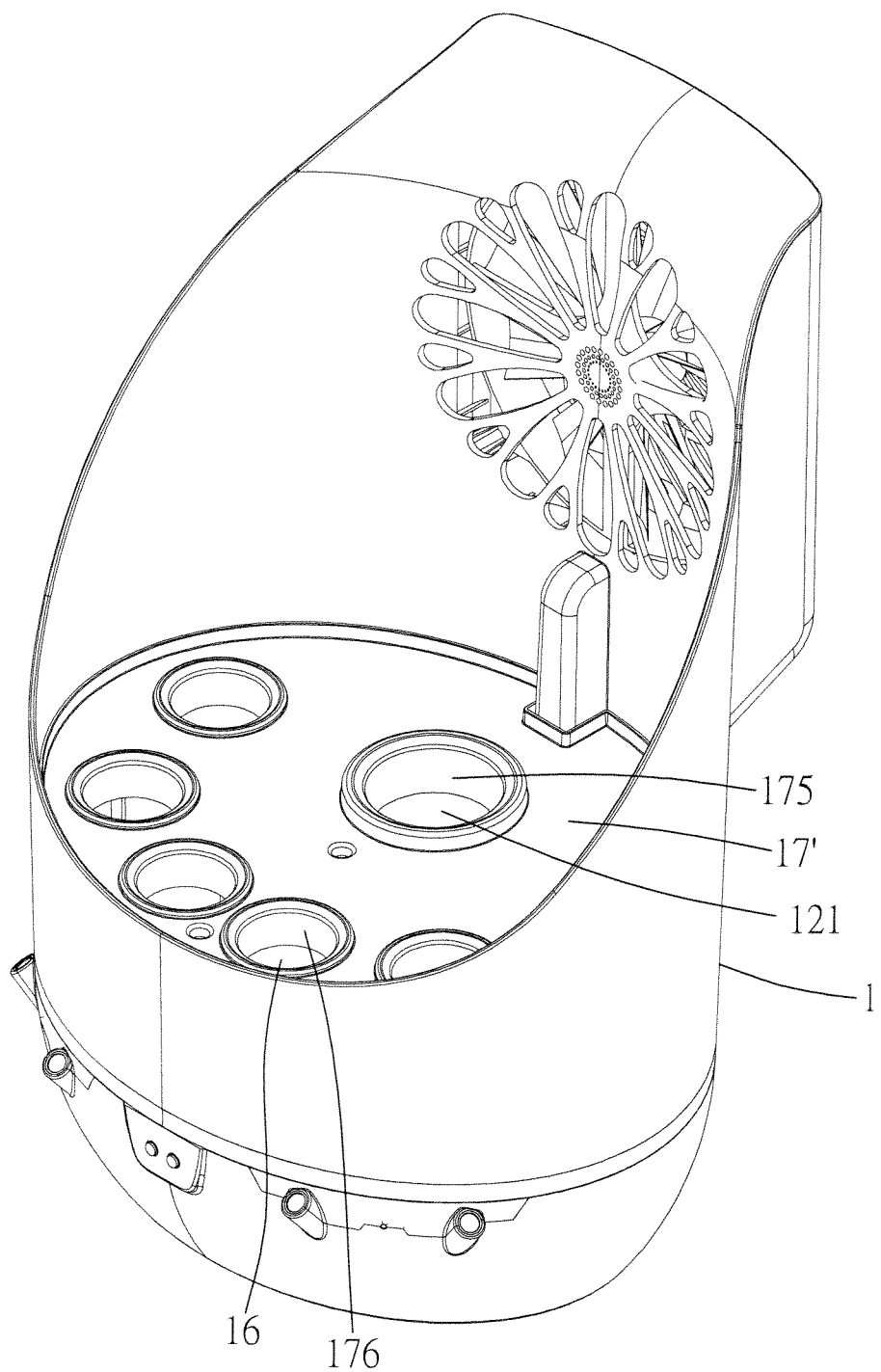
FIG. 9 is a perspective view illustrating a stimulating device of the second embodiment of the plant-based negative air ion producing device according to the disclosure.

Referring to FIG. 5, the negative voltage pulse module 3 of this embodiment includes a controller 31, an optical coupler 32 electrically coupled to the controller 31, a driving circuit 33 electrically coupled to the optical coupler 32, a voltage pulse generating circuit 34 coupled to the driving circuit 33, and a pair of first and second electrodes 301, 302. In one embodiment, the controller 31 may be implemented using an STC11 series single-chip microcontroller. The controller 31 may be configured, according to an activation signal associated with an NAI concentration and a continuous duration of NAI release stimulation that are set via a remote controller 4 or a keyboard (not shown), to execute table look-up instructions and time setting instructions and output a first control signal, such as a 5V pulse signal, based upon parameters obtained by execution of the instructions. The first control signal is transmitted to the driving circuit 33 via the optical coupler 32, which may provide good noise isolation between the controller 31 and the driving circuit 33. The driving circuit 33 has a half-bridge chip 331 that rectifies and amplifies the first control signal received from the optical coupler 32 to provide a 5V pulse signal with a large current, thereby driving a MOSFET switch 332 to output to the voltage pulse generating circuit 34 a 12V modulation driving signal with a large driving current. The voltage pulse generating circuit 34 includes a boost converter (T) that boosts a voltage level of the driving signal, and a rectifier circuit 340 that rectifies the boosted driving signal, so as to output the negative high voltage pulse to the first and second electrodes 301, 302, which are respectively coupled to the first and second terminals 22, 14 (see FIG. 2). The root portion of the plant 100 is then stimulated by the negative high voltage pulse via the culture medium and the first and second terminals 22, 14, thereby releasing NAI more efficiently. Since the housing 1 and plant pot 2 on which the first and second terminals 22, 14 are disposed are not electrically coupled together, a virtual loop is formed via air between the first and second electrodes 301, 302 that have no direct electrical connection therebetween, and the plant 100 releases NAI to the air. In this embodiment, the negative voltage pulse module 3 further includes a remote signal receiving circuit 35 configured to receive signals (e.g., the activation signal) from the remote controller 4.

The boost converter (T) of the voltage pulse generating circuit 34 includes a primary-side coil (N1) and a secondary-side coil (N2). The primary-side coil (N1) has a first terminal electrically coupled to the driving circuit 33 for receiving the driving signal therefrom, and a second terminal electrically coupled to a direct current voltage source 342 via a resettable fuse 341. When overcurrent occurs in the primary-side coil (N1), a resulted high temperature may cause the resettable fuse 341 to enter a non-conductive/electrically-isolating state, thereby protecting circuits from damage due to the overcurrent. Upon termination of the overcurrent and when the temperature becomes lower, the resettable fuse 341 may return to a conductive state. The secondary-side coil (N2) has a first terminal electrically coupled to the first electrode 301, and a second terminal electrically coupled to a cathode of a diode (D) that has an anode electrically coupled to the second electrode 302.

In this embodiment, the negative voltage pulse module 3 further includes a first resistor (R1) through which the first control signal is provided from the controller 31 to the optical coupler 32, and a second resistor (R2) electrically coupled between ground and a common node of the first resistor (R1) and the controller 31. The voltage division by the first and second resistors (R1), (R2) may effectively constrain a current flowing into the optical coupler 32 at the time of activation, thereby preventing the optical coupler 32 from damage due to an excessively high voltage provided by the controller 31.

When the root portion of the plant 100 is stimulated by the high negative voltage pulse, electrical discharge may occur at leaf tips of the plant 100. In order to prevent persons/animals from being frightened upon touching the leaf tips, the negative voltage pulse module 3 of this disclosure may further include at least one proximity sensor 36 (e.g., an ultrasonic proximity sensor) disposed on, for example, the second annular surrounding wall 11 of the housing 1, and electrically coupled to the controller 31, as shown in FIGS. 3 and 5, to thereby form an ultrasonic fence around the plant 100. When the proximity sensor 36 senses the presence of an object within a predetermined distance range, e.g., a 20 cm range, the proximity sensor 36 generates a second control signal that is provided to the controller 31 and that causes the controller 31 to stop output of the first control signal, so that the driving circuit 33 stops driving the voltage pulse generating circuit 34 to generate the negative high voltage pulse.

In this embodiment, multiple proximity sensors 36 that are disposed apart from each other on and around the second annular surrounding wall 11 are provided.

Even if the voltage pulse generating circuit 34 stops output of the negative high voltage pulse, electric charges may remain on the leaf tips of the plant 100. In order to further prevent persons/animals from being frightened upon touch, the voltage pulse generating circuit 34 may further include a third resistor (R3) electrically coupled between the first and second electrodes 301, 302. By virtue of the third resistor (R3), the remaining electric charges may be discharged through a discharging loop formed by the first electrode 301, the third resistor (R3) and the second electrode 302, thus preventing occurrence of electric shocks. In one embodiment, the third resistor (R3) has a resistance of 1100 M ohms.

In this embodiment, the stimulating device further includes a temperature and humidity sensor 37, a humidifier 38 (including a humidifier control circuit), and a fan device 39 (including a fan control circuit) that are disposed on the housing 1 and are electrically coupled to the controller 31. The temperature and humidity sensor 37 provides to the controller 31 a set of ambient temperature and humidity values sensed thereby. The controller 31 may control, according to a difference between a set of preset temperature and humidity values and the set of ambient temperature and humidity values sensed by the temperature and humidity sensor 37, operation of the humidifier 38 and a speed and a direction of wind provided by the fan device 39, to thereby make the ambient temperature and humidity approach the preset temperature and humidity values, which is usually set as being suitable for the presence of NAI.

In this embodiment, the humidifier 38 and the fan device 39 are disposed above the plant pot 2, and a spray outlet of the humidifier 38 faces toward a front side of the stimulating device, so that the spray provided by the humidifier 38 may be directly blown into the air by the fan device 39, thereby avoiding adhesion of the spray on the stimulating device which may otherwise lead to safety concerns, such as current leakage.

In this embodiment, the stimulating device further includes an NAI detector 51 that detects a concentration value of ambient NAI and that is electrically coupled to the controller 31 for providing thereto the concentration value of ambient NAI thus detected. The controller 31 may determine, according to a difference between a preset concentration value of NAI and the concentration value of ambient NAI detected by the NAI detector 51, whether or not to generate the first control signal, to thereby maintain the concentration of ambient NAI within an appropriate range. The temperature sensor 37, the humidifier 38, the fan device 39 and the NAI detector 51 may be integrated as a spatial NAI homogenizing device.

According to experiments, when the second annular surrounding wall 11 is spaced apart from the plant pot 2 by a distance that ranges between 50 mm and 200 mm such that the first and second electrodes 301, 302 are not electrically coupled together through connection between the housing 1 and the plant pot 2 (see FIG. 6), the NAI concentration measured at a location about 1 meter apart from the housing 1 is approximately 50,000 ions/$cm^3$. On the other hand, when the first and second electrodes 301, 302 are electrically coupled together via a wire between the housing 1 and the plant pot 2 (see FIG. 7), the NAI concentration measured at the same location is approximately 3,000 ions/$cm^3$. It is thus apparent that by virtue of the plant pot 2 being disposed in the inner chamber 121 of the housing 1, making the first and second electrodes 301, 302 not having direct electrical connection therebetween, the plant 100 may release NAI more efficiently, thereby promoting indoor NAI concentration.

FIG. 8 is a graph showing a record of the NAI concentration resulting from a pot of Agave americana stimulated by the negative high voltage pulse using the embodiment of the stimulating device according to this disclosure.

Referring to FIG. 9, in the second embodiment of the NAI producing device of this disclosure, the housing 1 may be configured for placing, in addition to the plant pot (not shown) configured for NAI release stimulation (e.g., a plant pot 2 in which a plant of the Agavoideae subfamily is cultivated, as shown in FIG. 1), multiple planters (not shown) each being smaller than the plant pot. Note that the planters may be used to cultivate plants of the Agavoideae subfamily or other kinds of plants therein. The second embodiment further differs from the first embodiment in that in lieu of the central opening 171 and the through holes 174 (see FIG. 2), the bearing plate 17' has a primary opening 175 that is spatially connected to the inner chamber 121 and that is configured for holding the plant pot, and multiple smaller secondary openings 176 that are configured for holding the planters. Each of the secondary openings 176 is in spatial connection with the outer chamber 16, so that a respective planter may be held in the outer chamber 16. In this embodiment, the secondary openings 176 are arranged in a vicinity of the primary opening 175.

In summary, by virtue of the first and second conductive terminals 22, 14 that are respectively disposed on the plant pot 2 and the housing 1 and that have no direct electrical connection therebetween, a virtual loop may be formed via the air between the first and second electrodes 301, 302, thereby stimulating the plant 100 to enhance its NAI release, so as to promote indoor NAI concentration. In addition, the design of the proximity sensor 36 and the third resistor (R3) may prevent persons/animals from suffering electric shocks when touching the plant 100. Through the design of the temperature and humidity sensor 37, the humidifier 38, the fan device 39 and the NAI detector 51, the ambient NAI concentration may be properly adjusted via the controller 31, to thereby maintain the ambient NAI concentration within an appropriate range, and air quality may thus be improved.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A stimulating device for enhancing release of negative air ions by a plant, said stimulating device comprising:

a housing including a first surrounding wall that defines an inner chamber;

a plant pot disposed in said inner chamber, wherein said plant pot is configured to receive a culture medium for cultivating the plant;

a first conductive terminal passing through said plant pot for contact with the culture medium;

a second conductive terminal spaced apart from said first conductive terminal, wherein said second conductive terminal is disposed on one of said housing and said plant pot; and said second conductive terminal is to be non-contact with the culture medium when the culture medium is placed in said plant pot; and a negative voltage pulse module disposed on said housing, wherein said negative voltage pulse module includes a first electrode electrically coupled to said first conductive terminal, and a second electrode electrically coupled to said second conductive terminal; and said negative voltage pulse module is configured to output a negative voltage pulse at said first electrode so as to stimulate the plant via the culture medium for enhancing release of the negative air ions;

wherein said housing further includes a second surrounding wall surrounding said first surrounding wall, and an interconnecting wall interconnecting bottom parts of said first and second surrounding walls;

wherein said second conductive terminal is disposed on said interconnecting wall of said housing, and said second conductive terminal is configured to be exposed in air when the culture medium is placed in said plant pot; and wherein said first conductive terminal passes through a bottom of said plant pot.

2. The stimulating device according to claim 1, wherein said housing further includes a bearing plate that has a plate portion separably disposed between said first and second surrounding walls and above said interconnecting wall;

wherein said bearing plate has a central opening in spatial communication with said inner chamber; and wherein said plate portion of said bearing plate, said first surrounding wall, said second surrounding wall and said interconnecting wall are configured to form an outer chamber.

3. The stimulating device according to claim 2, wherein said bearing plate has a bottom surface that is formed with a plurality of through holes, and an engaging portion that is hookably engaged with said first surrounding wall, said plant pot having a peripheral edge portion that abuts against a top part of said engaging portion, thereby hanging on said bearing plate.

4. The stimulating device according to claim 2, wherein said bearing plate has a bottom surface that is formed with an opening in spatial connection with said outer chamber for holding a planter.

5. The stimulating device according to claim 1, wherein said negative voltage pulse module includes:
a controller disposed to receive an activation signal and configured to generate a first control signal according to the activation signal;
an optical coupler electrically coupled to said controller for receiving the first control signal therefrom;
a driving circuit electrically coupled to said optical coupler for receiving the first control signal therethrough, and configured to generate a driving signal according to the first control signal; and
a voltage pulse generating circuit electrically coupled to said driving circuit for receiving the driving signal therefrom and configured to generate the negative voltage pulse according to the driving signal.

6. The stimulating device according to claim 5, wherein said voltage pulse generating circuit includes:
a boost converter including a primary-side coil and a secondary-side coil, wherein said primary-side coil has a first terminal that is electrically coupled to said driving circuit for receiving the driving signal therefrom; said primary-side coil further has a second terminal; said secondary-side coil has a first terminal that is electrically coupled to said first electrode; and said secondary-side coil further has a second terminal;
a resettable fuse electrically coupling said second terminal of said primary-side coil to a direct current voltage source; and
a diode having a cathode that is electrically coupled to said second terminal of said secondary-side coil, and an anode that is electrically coupled to said second electrode.

7. The stimulating device according to claim 5, wherein said negative voltage pulse module further includes a first resistor through which the first control signal is provided from said controller to said optical coupler, and a second resistor which electrically couples a common node of said first resistor and said controller to ground.

8. The stimulating device according to claim 5, further comprising:
a proximity sensor disposed on said housing, wherein said proximity sensor is electrically coupled to said controller; and said proximity sensor is configured to generate, upon detecting presence of an object within a predetermined distance range, a second control terminal that is provided to said controller and that causes said controller to stop output of the first control signal, so that said driving circuit stops driving said voltage pulse generating circuit to generate the negative voltage pulse.

9. The stimulating device according to claim 5, further comprising a temperature and humidity sensor, a humidifier, a fan device and a negative air ion detector, each of which is disposed on said housing and is electrically coupled to said controller, wherein:
said temperature and humidity sensor is configured to provide to said controller a set of ambient temperature and humidity values;
said negative air ion detector is configured to provide to said controller a concentration value of ambient negative air ions; and
said controller is further configured to control, according to a difference between a set of preset temperature and humidity values and the set of ambient temperature and humidity values sensed by said temperature and humidity sensor, operation of said humidifier and a speed and a direction of wind provided by said fan device, and to determine, according to a difference between a preset concentration value of negative air ions and the concentration value of ambient negative air ions detected by said negative air ion detector, whether or not to generate the first control signal.

10. The stimulating device according to claim 1, further comprising a resistor electrically coupled between said first and second electrodes.

11. A stimulating device for enhancing release of negative air ions by a plant, said stimulating device comprising:
a housing including a first surrounding wall that defines an inner chamber;
a plant pot disposed in said inner chamber, wherein said plant pot is configured to receive a culture medium for cultivating the plant;
a first conductive terminal passing through said plant pot for contact with the culture medium;
a second conductive terminal spaced apart from said first conductive terminal, wherein said second conductive terminal is disposed on one of said housing and said plant pot; and said second conductive terminal is to be non-contact with the culture medium when the culture medium is placed in said plant pot; and
a negative voltage pulse module disposed on said housing, wherein said negative voltage pulse module includes a first electrode electrically coupled to said first conductive terminal, and a second electrode electrically coupled to said second conductive terminal; and said negative voltage pulse module is configured to output a negative voltage pulse at said first electrode so as to stimulate the plant via the culture medium for enhancing release of the negative air ions; wherein said negative voltage pulse module includes:

a controller disposed to receive an activation signal and configured to generate a first control signal according to the activation signal;

an optical coupler electrically coupled to said controller for receiving the first control signal therefrom;

a driving circuit electrically coupled to said optical coupler for receiving the first control signal therethrough, and configured to generate a driving signal according to the first control signal; and a voltage pulse generating circuit electrically coupled to said driving circuit for receiving the driving signal therefrom and configured to generate the negative voltage pulse according to the driving signal; and wherein said voltage pulse generating circuit includes:

a boost converter including a primary-side coil and a secondary-side coil, wherein said primary-side coil has a first terminal that is electrically coupled to said driving circuit for receiving the driving signal therefrom; said primary-side coil further has a second terminal; said secondary-side coil has a first terminal that is electrically coupled to said first electrode; and said secondary-side coil further has a second terminal;

a resettable fuse electrically coupling said second terminal of said primary-side coil to a direct current voltage source; and a diode having a cathode that is electrically coupled to said second terminal of said secondary-side coil, and an anode that is electrically coupled to said second electrode.

12. A stimulating device for enhancing release of negative air ions by a plant, said stimulating device comprising:

a housing including a first surrounding wall that defines an inner chamber;

a plant pot disposed in said inner chamber, wherein said plant pot is configured to receive a culture medium for cultivating the plant;

a first conductive terminal passing through said plant pot for contact with the culture medium;

a second conductive terminal spaced apart from said first conductive terminal, wherein said second conductive terminal is disposed on one of said housing and said plant pot; and said second conductive terminal is to be non-contact with the culture medium when the culture medium is placed in said plant pot; and a negative voltage pulse module disposed on said housing, wherein said negative voltage pulse module includes a first electrode electrically coupled to said first conductive terminal, and a second electrode electrically coupled to said second conductive terminal; and said negative voltage pulse module is configured to output a negative voltage pulse at said first electrode so as to stimulate the plant via the culture medium for enhancing release of the negative air ions;

wherein said negative voltage pulse module includes:

a controller disposed to receive an activation signal and configured to generate a first control signal according to the activation signal;

an optical coupler electrically coupled to said controller for receiving the first control signal therefrom;

a driving circuit electrically coupled to said optical coupler for receiving the first control signal therethrough, and configured to generate a driving signal according to the first control signal; and a voltage pulse generating circuit electrically coupled to said driving circuit for receiving the driving signal therefrom and configured to generate the negative voltage pulse according to the driving signal;

said stimulating device further comprising a temperature and humidity sensor, a humidifier, a fan device and a negative air ion detector, each of which is disposed on said housing and is electrically coupled to said controller, wherein:

said temperature and humidity sensor is configured to provide to said controller a set of ambient temperature and humidity values;

said negative air ion detector is configured to provide to said controller a concentration value of ambient negative air ions; and said controller is further configured to control, according to a difference between a set of preset temperature and humidity values and the set of ambient temperature and humidity values sensed by said temperature and humidity sensor, operation of said humidifier and a speed and a direction of wind provided by said fan device, and to determine, according to a difference between a preset concentration value of negative air ions and the concentration value of ambient negative air ions detected by said negative air ion detector, whether or not to generate the first control signal.

* * * * *